April 13, 1954    E. A. FREDRICKSON ET AL    2,675,017
KNEE ACTUATED MIXING VALVE
Filed Aug. 14, 1950    2 Sheets-Sheet 1

Inventors,
Edward A. Fredrickson, &
Carl R. Stone.
By Joseph O. Lange, Atty.

April 13, 1954  E. A. FREDRICKSON ET AL  2,675,017
KNEE ACTUATED MIXING VALVE

Filed Aug. 14, 1950  2 Sheets-Sheet 2

Inventors.
Edward A. Fredrickson &
Carl R. Stone.
By Joseph O. Long
Atty.

Patented Apr. 13, 1954

2,675,017

UNITED STATES PATENT OFFICE 2,675,017

KNEE ACTUATED MIXING VALVE

Edward A. Fredrickson and Carl R. Stone, Chicago, Ill., assignors to Crane Co., Chicago, Ill., a corporation of Illinois Application August 14, 1950, Serial No. 179,116

5 Claims. (Cl. 137—356)

This invention pertains to a combined enclosure and valve actuating mechanism and applies, particularly, to an improved knee actuated mixing valve or the like, which is of the general type shown in United States Patent No. 2,094,288, granted September 28, 1937.

At the outset, the structure of presently constituted knee actuated valves should be understood in order to acquire a full appreciation of the merits of this invention. The above-mentioned present valve structure is relatively difficult to maintain and service, realizing that most of the parts thereof are inconvenient to remove and inspect, even after the valve has been removed from the fixture. Thus, it has long been a problem to provide for the servicing of these valves without encountering somewhat awkward and time-consuming disassembling procedures. This is especially true in regard to repair or renewal of the inner valve trimmings which consist of relatively numerous parts and ordinarily require a special seat wrench for the tooling thereof. Also, separate machining operations are usually required from each end relative to the present valve body thereby to provide for properly receiving the said trimmings. It should also be understood that the said machining operations must be extremely accurate to ensure the necessary alignment of the opposite end chambers. Without the above alignment, the then existent eccentricity will cause binding and other operational difficulties with reference to the valve trimmings.

In considering the present valves, it should be noted that a relatively heavy structure is embodied in the said valve, particularly in the conventional spring-loaded features which require the use of one spring for compressing the packing material and one relatively heavy spring for aiding in effecting the valve operation. The said latter spring has frequently in the past been located of necessity in the liquid line, thus preventing direct and proper lubrication thereof and frequently presenting problems of erosion and the like, requiring regular inspection and repair.

Other prior disadvantages of the valve springs include the objection of sluggish valve operation as the moving parts have been secured or connected by two springs per trimming with one of said springs being relatively heavy. Since the accurate proportioning and delivery of hot and cold water is dependent upon the prompt and positive actuation of the mixing valve, such sluggish operation of the valve is significant in its detrimental effect upon the resultant water temperature.

Therefore, it is an object of this invention to provide a mixing valve structure which is preferably knee-actuated and which includes the actuating mechanism suitably attached to the casing of said valve, as hereinafter set forth. By this arrangement, removal of the said casing will also permit the removal of the said actuating mechanism and, thus, beneficially expose the remainder of the valve for inspection and replacement.

It is another object to provide a knee actuated mixing valve structure which includes easily removable trimmings, a portion of each of the latter assembled as one unit within the valve body and removable as such.

A further object is to provide a knee actuated mixing valve structure, the machining of which may be approached and accomplished from only one end of the valve body, the latter machining being primarily for the purpose of receiving the trimmings within said body. Thus, simple and effective concentricity of assembly is insured and the problems of valve binding, parts distortion with difficulty of removal and related troubles are minimized.

Still a further object of this invention is to provide a knee actuated mixing valve structure which comprises fewer parts in the trimmings thereof.

And still a further object is to provide a knee actuated mixing valve structure, which requires only a single spring per trimming or valve assembly and locates the said spring out of the liquid line, thus permitting convenient and effective lubrication thereof. It will also be apparent that with only one spring per trimming, the said valve is easier to operate, providing for better temperature control of the mixed liquid. Also, the said springs may be of lighter weight, thereby reducing the wear on the moving parts of said valve.

It has been found that the economical advantage of this invention, in connection with the foregoing introduction and objects, results in reducing the manufacturing costs approximately one-third of the present valve cost while maintaining improved and very desirable operational features with substantially increased durability in the structure.

Numerous other objects and advantages will become apparent upon reading the following description in light of the accompanying drawings, in which:

Fig. 1 is a reduced general assembly view showing a preferred embodiment of this invention attached to a fixture, such as a sink, lavatory, or the like.

Similar reference numerals refer to similar parts throughout the several views.

Figure 1:
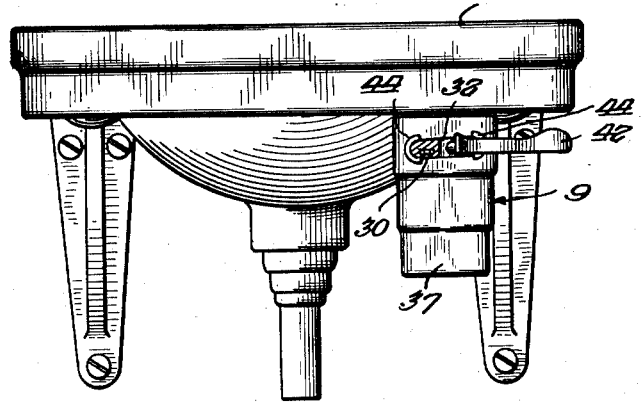

As shown in Fig. 1, a preferred embodiment of this invention comprises a knee actuated mixing valve, generally designated 9, preferably attached at the lower rim or apron portion of a lavatory fixture or the like, which is designated 10. The attachment to the said fixture is preferably accomplished by means of a mounting plate 11 secured thereto by means of two screws 12, as shown more clearly in Fig. 2. Continuing with reference to the latter figure, two mounting rods 13 are threadedly connected to the plate 11 and, thus, depend therefrom to support the multiple valve body 14 by their extension through the preferably integral shanks 16 of valve body 14. The rods 13 are fastened thereto by means of the nuts 17. It should be clear that the rods 13 are of a predetermined length and enter into the mounting plate 11 and the shank 16 to abut shoulders therein, as indicated, thus conveniently and accurately locating the valve body 14 in the required position relative to the fixture as hereinafter explained in greater detail.

The multiple valve body 14 comprises the respective hot and cold water inlet sections 18 and 19, and the common outlet or discharge therefrom designated 21. Located directly above the inlet sections 18 and 19, the trimming units 22 and 23 respectively are positioned and thread into the valve body 14 to predeterminately interrupt and permit fluid flow therethrough, as will hereinafter become apparent. A pair of locknuts 24 and 25 are threadedly attached to the valve units 22 and 23, respectively, to further secure the same to the body 14 and to effectively seal the water therein by means of a locknut gasket (not shown) disposed below each of the locknuts 24 and 25. By merely unscrewing the trimming units 22 and 23, the said units can be easily lifted out and removed from the body 14. Further details of units 22 and 23 are not deemed necessary for a description of this invention, but may be found in U. S. Patent No. 2,520,092, issued August 22, 1950.

Two stem nuts 26 and 27 project upward from within the units 22 and 23, respectively, and are reciprocably actuated therein by a means hereinafter described. A yoke member 28 common to both of said units, as illustrated, and having a pair of tapped holes to receive two adjustable cap screws 29 and 30, is threadedly mounted on a handle sleeve 32 through a lower sleeve screw 33 threaded therein, as shown more clearly in Fig. 3. It should be understood, therefore, that mere rotation of the sleeve 32 will reciprocate the screw 33 and the yoke 28. The cap screws 29 and 30 are properly spaced longitudinally to abut the respective valve stem nuts 26 and 27, and, thus, reciprocably actuate the valves in the usual manner to accomplish the desired mixing or proportioning of liquid flow therefrom. A yoke locknut 34 is threaded onto the screw 33 to secure the yoke 28 and to retain a friction spring 36 preferably of angular shape which slides on vertically disposed guides (shown in Fig. 3) integral with the enclosure or cover plate 37 to retard the reciprocal movement of the valve yoke as desired. Spring 36 also inhibits rocking of yoke member 28.

Figure 2:
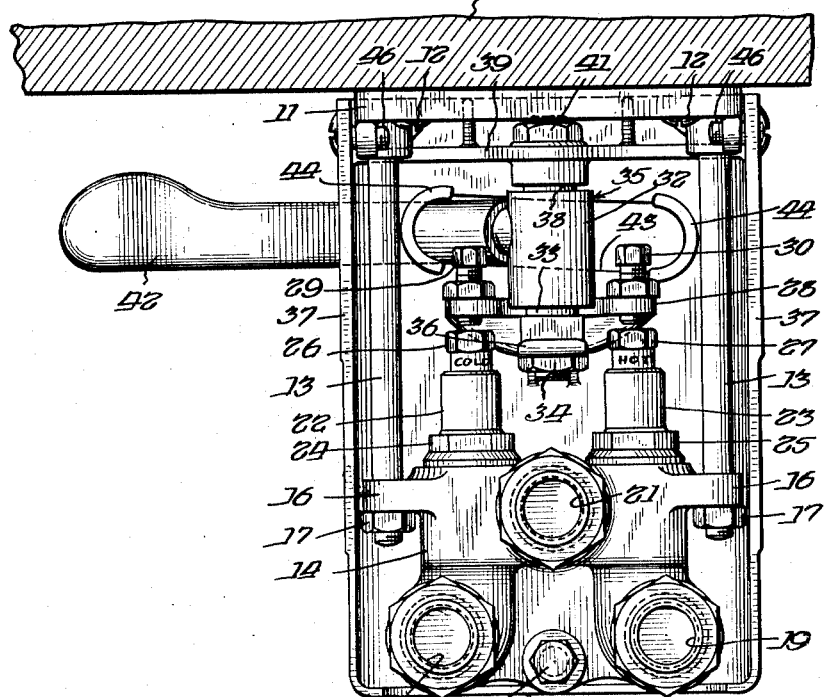
Fig. 2 is an interior rear assembly view of a preferred embodiment of this invention.
Figure 3:
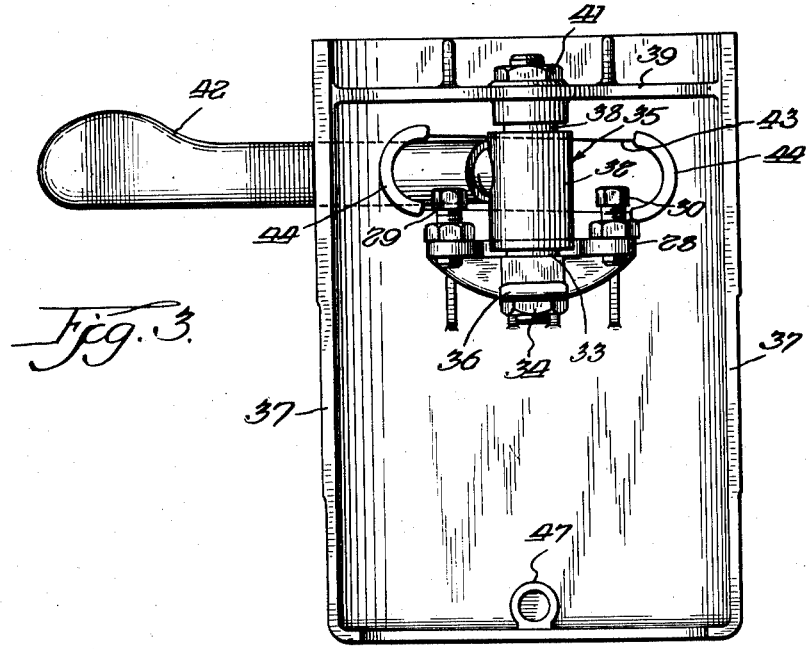
Fig. 3 is a rear view of the valve cover and actuating mechanism shown in Fig. 2 without the valves.

As shown more clearly in Figs. 2 and 3, the upper end of the actuating mechanism, generally designated 35, includes an upper sleeve screw 38 which is received in an opening in the rib 39 which is preferably integral with the cover plate 37. A locknut 41 secures the sleeve screw 38, and, thus, the entire actuating mechanism 35 to the cover plate 37. A handle 42, which may be of stirrup form, as shown in Fig. 3, is threaded onto the handle sleeve 32 and projects through the angularly disposed slot or aperture 43 in the cover plate 37 to normally receive the knee of a person moving the stirrup pivotally in a substantially horizontal plane to operate the valve. If desired, the slightly inclined slotted aperture 43 is provided with the usual end limit stops or bumpers 44 located on the ends thereof to define the limits of pivotal movement of the handle 42.

It should also be understood that the sleeve screws 33 and 38 operate on right and left hand threaded portions within the sleeve 32, as the stirrup handle 42 is turned. By such movement, it will be clear that the sleeve 32 is displaced downwardly on screw 38, and screw 33 is displaced downwardly in relation to actuating sleeve 32.

As shown in Fig. 2, the novel feature of this invention lies in the means of mounting the cover plate 37 containing the actuating mechanism 35. This is accomplished by means of the two screws 46 passing through a top portion of the plate 37 to thread into the mounting plate 11. As shown in Fig. 3, the lower interior portion of the cover plate 37 is provided with a threaded shank 47 which is aligned in assembly with a hole 48 (Fig. 4) in the body 14 through which a screw 49 (Fig. 2) attaches the plate 37 to the body 14 without any interference with the multiple body or the actuating mechanism insofar as operation, accessibility, or inspection is concerned.

Figure 4:
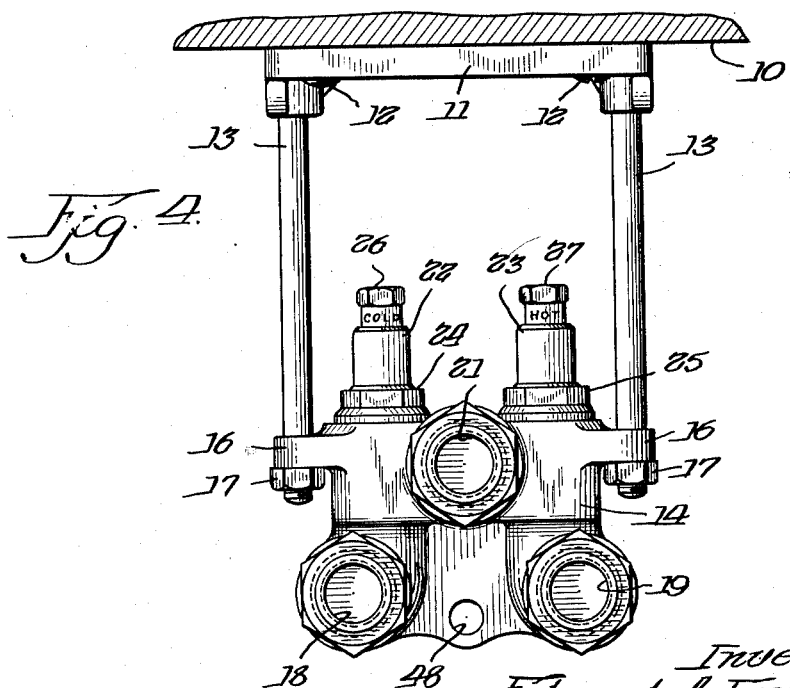
Fig. 4 is a view of the valves proper, as shown in Fig. 2, and with the actuating mechanism removed.

It should thus be understood that a simple and effective means has been devised to assemble the unit shown in Fig. 3 to that remaining portion of assembly shown in Fig. 4. In summary, when servicing of the valve is required, removal of accessible screws 46 and 49 will permit easy removal of the cover plate 37 with the mechanism 35 attached thereto and leave the remainder of the valve, as shown in Fig. 4, conveniently accessible. The units 22 and 23 may then be detached from the body 14 and entirely lifted therefrom for reasons hereinabove referred to.

Nothing heretofore to our knowledge in this field has possessed such benefits and novelty, and, therefore, although this invention has been shown and described in but one specific form, it is not intended to be so limited, since it is susceptible to numerous changes without departing from the spirit thereof or the scope of the appended claims.

We claim:

1. Combined actuating and enclosure means for a valve or the like, the combination comprising a mounting member having means for attachment to a valve body and adapted for attachment to the undersurface of a sink, lavatory, or the like, a cover plate depending from the said mounting member, means for attaching said cover plate to said mounting member and extended means comprising elongated members for attachment of the valve to the mounting member, valve actuating means connected to a central portion of said cover plate, the said valve actuating means and cover plate being removable independently of the valve and the said mounting member upon detachment of said cover plate from the mounting member.

2. Combined enclosure and actuating means for a valve, the combination including a mounting member suitable for attachment to the underside of sink, lavatory or the like, oppositely disposed depending means therefrom for attaching the valve to the said mounting member, a cover plate removably attached to said mounting member and the said valve, pivotally movable valve actuating means attached to an inner projecting portion of said cover plate to cooperate with said valve for opening and closing the latter, the said depending means, the valve, and the said mounting member being separable as a unit from the said cover plate and the actuating means upon detachment of the said cover plate from the valve and mounting member.

3. In a separable cover and actuating mechanism for a valve comprising in combination a mounting plate for attachment to the underside of a fixture or the like, a plurality of depending rods attached to said mounting plate for connecting the valve to the said mounting plate, an apertured cover plate enclosing a rim portion of the mounting plate, means for removably connecting said cover plate to said mounting plate and the valve, a valve actuating mechanism removably attached to an inner surface of the said cover plate and pivotally operable within the aperture of the said cover plate to actuate the valve, the said removable means providing that upon detaching said cover plate from the said mounting plate and from the said valve, the actuating mechanism, including the said apertured cover plate, may be independently removed as a unit.

4. Combined valve actuating and enclosure means for attachment to a fixture of the character described comprising in combination a mounting plate for attachment to the fixture, spaced-apart depending means for attaching the valve body to a lower portion of the said mounting plate, an apertured cover plate attached to said monuting plate, valve actuating means including a yoke member attached to an inner ribbed surface of said cover plate to actuate the valve, the said actuating means having a portion thereof movable within the aperture of said cover plate and being removable as a unit with said yoke member and the said cover plate independently of the valve, the said depending means and the mounting plate.

5. Combined valve actuating and enclosure means for a valve or the like comprising in combination a mounting plate, depending rods supported by said mounting plate for joining the valve to the said mounting plate, removable actuating means engageable with the valve and supported by the said mounting plate, a cover plate having outwardly accessible means for attachment to said mounting plate and to the valve, connecting means on an upper portion of said cover plate for securing said actuating means thereto, a handle detachably secured to the said actuating means, the said actuating means being removable as a unit from the valve, the said mounting plate rods, and the mounting plate.

References Cited in the file of this patent

UNITED STATES PATENTS

| Number | Name | Date |
| --- | --- | --- |
| 853,726 | Newton | May 19, 1907 |
| 867,580 | Hooper | Oct. 8, 1907 |
| 893,770 | Wilson | July 21, 1908 |
| 1,674,365 | Hohmeister | June 19, 1928 |
| 2,094,288 | Zinkle | Sept. 28, 1937 |
| 2,116,806 | Zinkle | May 10, 1938 |
| 2,448,231 | Molloy | Aug. 31, 1948 |